United States Patent
Baessler et al.

[11] Patent Number: 5,567,335
[45] Date of Patent: Oct. 22, 1996

[54] PROCESS AND APPARATUS FOR WELDING SHEET METAL EDGES

[75] Inventors: Peter Baessler, Bellikon; Alan Marriott, Andelfingen; Urs Maurer, Schaffhausen; Marcel Oberholzer, Kindhausen, all of Switzerland

[73] Assignee: Elpatronic AG, Zug, Switzerland

[21] Appl. No.: 352,546

[22] Filed: Dec. 9, 1994

[30] Foreign Application Priority Data

Dec. 15, 1993 [CH] Switzerland ............................. 3755/93
Mar. 21, 1994 [CH] Switzerland ............................. 861/94

[51] Int. Cl.⁶ ..................... B23K 11/087; B23K 13/02; B23K 26/02
[52] U.S. Cl. ..................... 219/61.2; 219/61.3; 219/59.1
[58] Field of Search ..................... 219/59.1, 61.13, 219/61.2, 61.3, 64, 67; 228/147

[56] References Cited

U.S. PATENT DOCUMENTS

| | | | |
|---|---|---|---|
| 3,944,782 | 3/1976 | Metcalfe et al. | 219/152 |
| 4,354,090 | 10/1982 | Nilsen | 219/121.63 |
| 4,577,088 | 3/1986 | Sharp | 219/121.64 |
| 4,771,931 | 9/1988 | Matsui et al. | 228/147 |
| 5,140,123 | 8/1992 | Mitani | 219/61.2 |
| 5,158,227 | 10/1992 | Esson | 228/147 |

FOREIGN PATENT DOCUMENTS

| | | | |
|---|---|---|---|
| 0509462 | 10/1992 | European Pat. Off. | B23K 13/02 |
| 61-38787 | 7/1984 | Japan | B23K 11/24 |
| 63-2158383 | 3/1987 | Japan | B23K 11/24 |
| 1-218775 | 2/1988 | Japan | B23K 11/14 |
| WO9002016 | 3/1990 | WIPO | B23K 37/04 |

OTHER PUBLICATIONS

Technische Mitteilungen AEG Telefunken, Bd. 63, Nr. 3, 1973, Jurt Flick, "Hochfrequenz–Erwärmungsanlage zum induktiven Längsnahtachweissen von Rohren".

Primary Examiner—Teresa J. Walberg
Assistant Examiner—J. Pelham
Attorney, Agent, or Firm—McCormick, Paulding & Huber

[57] ABSTRACT

Sheet metal edges to be welded are preheated prior to welding. At a given welding speed, this results in a smaller temperature gradient in the material to be welded. Consequently the welding speed can be increased, or material which would otherwise provide poor weld quality can be welded at a high temperature gradient. The preheating is carried out for example by high-frequency excitation of the material to be welded.

12 Claims, 1 Drawing Sheet

PROCESS AND APPARATUS FOR WELDING SHEET METAL EDGES

BACKGROUND OF THE INVENTION

The invention lies in the field of welding technology and relates to a process and an apparatus for welding sheet metal edges, in particular for the manufacture of container bodies in the form of hollow cylinders by welding together (for example by resistance welding, mash welding or laser welding) the edges of a metal sheet which has been suitably cut to size and then subjected to a rounding process in which opposite edges of the sheet are juxtaposed, or for the manufacture of composite panels by welding together flat sheet metal parts, the said panels subsequently being shaped by deep drawing.

According to the state of the art, the bodies of sheet metal cans, for example cans made from sheet steel or tin plate, are produced by cutting pieces of sheet metal from a coil, rounding them in a rounding apparatus, and welding together the edges that has been juxtaposed by the rounding, usually by electrical resistance welding, or by laser welding or another welding process. To weld the edges, they are precisely positioned, for example by being guided in a Z-shaped rail with two guide slots, and are guided continuously through a welding station which in the case of resistance welding usually comprises two welding electrodes in the form of rollers between which the overlapping sheet metal edges to be welded are guided and simultaneously welded.

With a view to stepping up production for the welding of composite panels or can bodies including those with extended weld seams, whereby the product can be made more cheaply, there is a desire to speed up the welding of the sheet metal edges, that is to say, to guide them through the welding station more and more rapidly so that the material to be welded has to be heated to welding temperature more and more rapidly. The application of the necessary thermal energy limits the welding speed on the one hand because of purely physical considerations. For example, in the case of resistance welding with excessive power flows, when non-uniformities cannot be avoided, spatter is produced due to local over heating; and in the case of laser welding with excessive power flows, the laser is defocused in the resulting metal vapour plasma. On the other hand, the stresses occurring in the material when it is heated are greater if the heating rate is increased, and can adversely affect the quality of the product. As a result, the choice of materials which can be used is restricted, and in particular it is difficult or impossible to weld cheaper material of lower quality at equally high speeds, as the susceptibility to cracking due to thermal stresses is higher in such materials.

It is an object of the invention to provide a process and an apparatus by means of which the welding speed can be increased beyond the above-mentioned limits without thereby necessitating costly elaboration to the equipment that is required.

It should therefore be possible, with the process and the apparatus according to the invention, for example to weld sheet metal edges more rapidly in materials which can be welded without any problem according to the state of the art, and to weld can bodies or panels in materials of lower quality at the speeds which are usual according to the state of the art without any loss of quality.

This object can be achieved by the process and apparatus defined in the claims.

SUMMARY OF THE INVENTION

The process according to the invention and the apparatus according to the invention are based on the idea of preheating the sheet metal edges before they are fed into the welding station so that, although the mechanical properties of the material are not yet affected to such an extent that it can no longer be easily and accurately guided and advanced, the temperature of the edges to be welded is already sufficiently high immediately before welding to make a noticeable reduction in the temperature gradient likely to be encountered at a given welding speed. Since the temperature gradient is itself a major limiting factor for the welding speed of particular materials, the added process stage of preheating prior to welding means that, for example, the maximum welding speed for a given material can be increased, or that for a lower-grade material a weld of satisfactory quality can be obtained at normal speeds.

It has been found that with preheating in such a manner that the edges to be welded already contain, immediately before welding, 5 to 40%, and in particular 10 to 15%, of the thermal energy necessary for welding (through having their temperature raised above room temperature), these edges can nevertheless be fed to the welding station by means of a known, in particular Z-shaped, guide, and that the maximum welding speed specific to the material being welded can thereby be significantly increased. For the production of resistance welded sheet steel bodies, which are usually produced at a material-specific welding temperature of approx. 1000° to 1600° C., this implies pre-heating the edges to be welded to approx. 100° to 600° C.

BRIEF DESCRIPTION OF THE DRAWINGS

The process according to the invention and examples of apparatus for carrying out the process will now be described in detail with reference to the accompanying drawings, in which.

DESCRIPTION OF THE PREFERRED EMBODIMENTS

Figure 1:
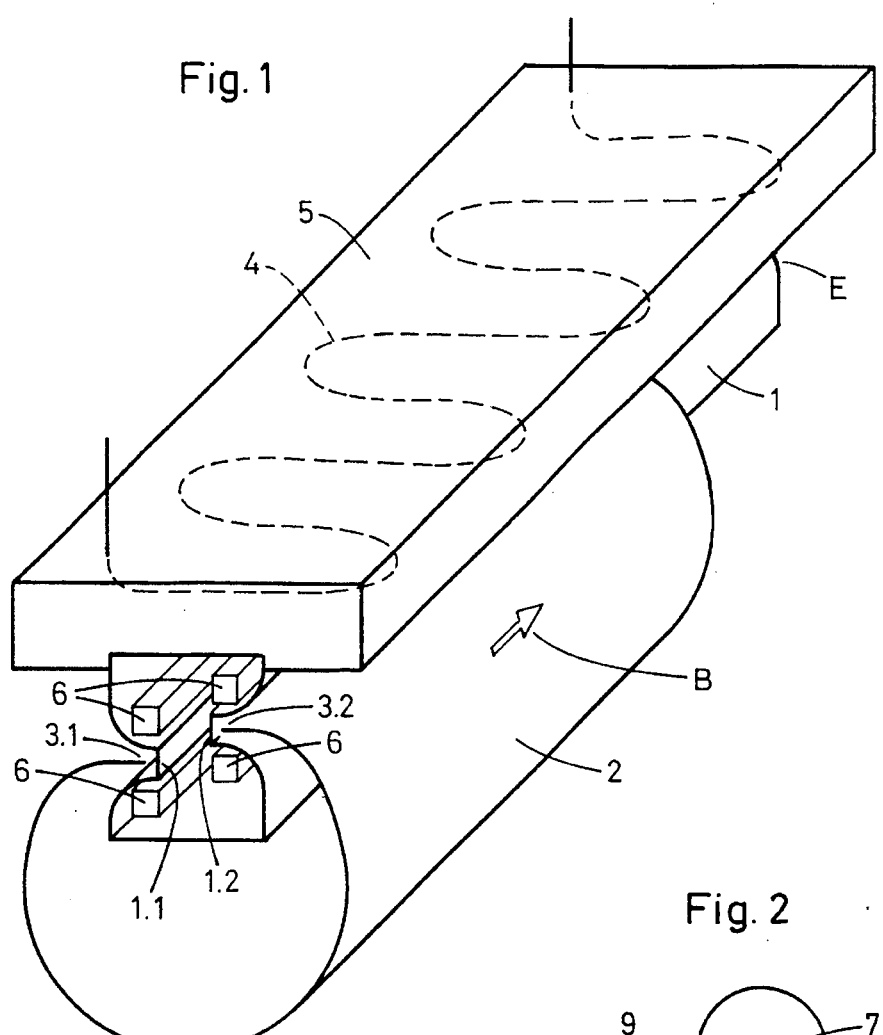
FIG. 1 shows an exemplifying embodiment of apparatus according to the invention, applied to welding of can bodies.

FIG. 1 illustrates part of an embodiment of apparatus according to the invention, applied to the welding of can bodies. This comprises a Z-shaped guide 1 of known type with guide slots 1.1 and 1.2 for the two sheet metal edges to be welded; this so-called Z-rail, which is usually made in a ceramic material, serves to guide the welding edges of the rounded metal sheet 2 forming the can body during its movement (Arrow B) towards the welding station and to position them in relation to one another for welding. The feed arrangement (not shown in the drawing) whereby the bodies are advanced to the welding station may for example be power-driven chains with pusher dogs. The welding station (likewise not shown in the drawing) adjoins the end E of the Z-rail at which the edges to be welded leave the Z-rail.

At least the sheet metal edges 3.1 and 3.2 which are guided in the Z-rail 2 are preheated, for example by being excited at high frequency. For this purpose, a high-frequency coil 4 accommodated in a support body mounted on the Z-rail 1 is provided, for example. As shown schematically in the figure and designated by the reference number 6, high-frequency conductors incorporated in the Z-rail may also be provided.

By way of example, a high-frequency generator with an output of 3 kW (4300 kcal/h) and a frequency of approx. 700 kHz may be used.

Figure 2:
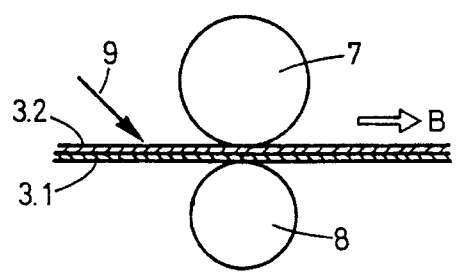
FIG. 2 shows in a highly schematic representation another exemplifying embodiment of apparatus according to the invention.

FIG. 2 is a highly schematic representation, in section, of the sheet metal edges 3.1 and 3.2 to be joined together in a mash weld. The overlapping edges are guided for welding in the direction B between two welding rollers 7 and 8. Before a given zone on the edges passes between the welding rollers, it is preheated by a focused laser beam 9. This laser beam must be arranged so that the distance to be traversed by a preheated zone on the edges to be welded between preheating and welding is as short as possible so that as much as possible of the energy applied by the laser beam is still present at that zone during welding.

Instead of a laser beam, other radiated energy from a corresponding radiation source can also be used.

Figure 3:
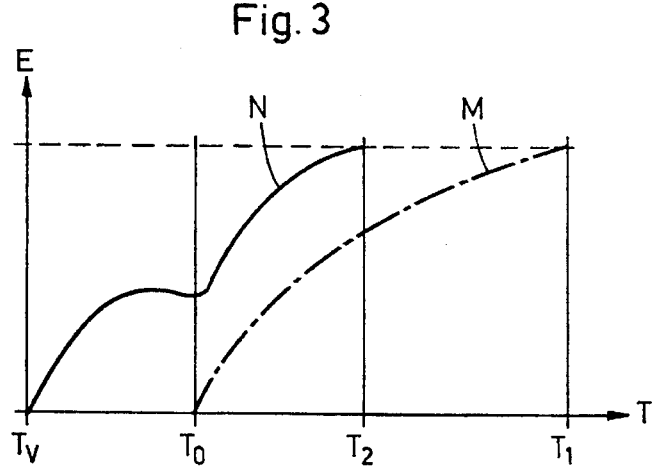
FIG. 3 is a diagram illustrating the advantages of the process according to the invention.

FIG. 3 shows schematically the increase in the energy content of a zone on the edges to be welded by the process according to the invention (Curve N) and by a process according to the state of the art (Curve M). Time T is plotted on the x-axis, and the energy content E of the edge zone under consideration is plotted on the y-axis. In a process according to the state of the art (Curve M), the edge zone under consideration arrives at the welding station at time $T_0$ and for a given power-flow possesses the energy necessary for welding at time $T_1$. The elapsed time between $T_0$ and $T_1$ directly determines the maximum welding speed. In the process according to the invention (Curve N), the edge zone under consideration enters the preheat at time $T_v$, that is to say it reaches for example the area of action of the laser beam, (FIG. 2). As the zone passes through the region of the laser beam, its energy content increases, after which it may fall slightly before it enters the welding station. In the welding station, energy is added, for example with the same power flow as that assumed for Curve M, so that the zone has the energy necessary for welding at the time $T_2$. The elapsed time between $T_0$ and $T_2$ is significantly shorter than the time between $T_0$ and $T_1$, so that a higher welding speed is possible in the process according to the invention.

Other methods for preheating the sheet metal edges to be welded could, of course, be used. For example, a preheating station may be provided to heat both edges together, or each one separately, by passing an electric current through these edges. Such a preheating station is very similar as a piece of apparatus, and in its function, to a station for resistance welding; but it uses much smaller currents than a welding station.

We claim:

1. Process for welding sheet metal edges, in particular for welding two edges of a rounded metal sheet to produce a container body, by positioning the edges to be welded in relation to one another by guide means comprising a Z-shaped rail having guide slots for engaging the edges to be welded and guiding the edges together at a welding station in which they are welded together, characterized in that the sheet metal edges to be welded are preheated prior to welding by preheating the sheet metal edges in region of the guide means.

2. Process according to claim 1, characterized in that the sheet metal edges to be welded are preheated by high-frequency excitation.

3. Process according to claim 1, characterized in that the edges to be welded are preheated by a focused laser beam.

4. Process according to claim 1, characterized in that the preheating is performed in such manner that the sheet metal edges to be welded contain, immediately before welding, 5 to 40% of the welding energy.

5. Process according to claim 1, characterized in that the preheating is performed so that the sheet metal edges to be welded already contain, immediately before welding, 10 to 15% of the thermal energy required for welding.

6. Process according to claim 1, characterized in that the sheet metal edges to be welded are of sheet steel and are preheated to 100° to 600° C.

7. Apparatus for welding sheet metal edges comprising:

a welding station, guide means comprising a Z-shaped rail having guide slots for bringing the edges to be welded together in relation to one another, a feed arrangement whereby the sheet metal edges can be positioned in relation to one another for welding and can be propelled into the welding station, and preheating means with which the edges to be welded can be preheated prior to welding, said preheating means located in a region of the guide means upstream from the welding station in the direction of movement of the edges to be welded.

8. Apparatus according to claim 7, characterized in that the preheating means comprise a high-frequency coil located in a support body mounted on the Z-shaped rail.

9. Apparatus according to claim 7, characterized in that the preheating means are high-frequency conductors arranged in the Z-rail.

10. Apparatus according to claim 7, characterized in that the preheating means comprise two electrodes contacting the edges to be welded.

11. Apparatus according to claim 7, characterized in that the preheating means comprise a radiation source.

12. Apparatus according to claim 11, characterized in that the preheating means comprise means for emitting and focusing a laser beam.

* * * * *